(12) United States Patent
Kim

(10) Patent No.: US 8,607,257 B2
(45) Date of Patent: Dec. 10, 2013

(54) SPINDLE MOTOR

(75) Inventor: Yongjoo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 77 days.

(21) Appl. No.: 13/240,176

(22) Filed: Sep. 22, 2011

(65) Prior Publication Data

US 2012/0110606 A1    May 3, 2012

(30) Foreign Application Priority Data

Oct. 27, 2010   (KR) .................. 10-2010-0105195

(51) Int. Cl.
  *G11B 19/20*   (2006.01)
(52) U.S. Cl.
  USPC ........................................................ 720/695
(58) Field of Classification Search
  USPC ........................................................ 720/695
  See application file for complete search history.

(56) References Cited

U.S. PATENT DOCUMENTS

| 5,228,023 | A  | * | 7/1993  | Hartog | 720/704 |
| 5,758,408 | A  | * | 6/1998  | Choi   | 29/732  |
| 6,877,164 | B2 | * | 4/2005  | Lee    | 720/695 |
| 8,074,238 | B2 | * | 12/2011 | Woo    | 720/702 |

* cited by examiner

*Primary Examiner* — Mark Blouin
(74) *Attorney, Agent, or Firm* — Saliwanchik, Lloyd & Eisenschenk

(57) ABSTRACT

Disclosed is a spindle motor, the spindle motor including a turntable coupled to a rotating shaft and supporting the rotating shaft and a disc, a centering unit fitted over the rotating shaft and supporting an inner circumference of the disc, and a coil spring interposed between the turntable and the centering unit to elastically support the centering unit, wherein a first end of the coil spring is brought into contact with a spring hanging portion protruding from a side surface of the centering unit, and a second end opposite to the first end of the coil spring is supported by a spring support portion formed in the turntable.

18 Claims, 2 Drawing Sheets

SPINDLE MOTOR

CROSS-REFERENCE TO RELATED APPLICATION

This application claims the benefit under 35 U.S.C. §119 of Korean Application No. 10-2010-0105195, filed Oct. 27, 2010, which is hereby incorporated by reference in its entirety.

BACKGROUND OF THE INVENTION

1. Field of the Invention

The present invention relates to a spindle motor.

2. Description of the Related Art Generally, a spindle motor that is one of disc rotating devices has been widely used to rotate a disc, such as an optical disc drive (ODD) and a hard disc, at a very high speed.

The spindle motor, which is one of the disc rotating devices, includes a turntable and a centering unit. The turntable is coupled to a rotating shaft rotating a disc at a very high speed, with the disc being disposed on the turntable. The centering unit is fitted over the rotating shaft to be coupled to an inner circumference of the disc. Further, a spring is interposed between the turntable and the centering unit. Generally, an imaginary line connecting an upper end of an outer surface of the spring interposed between the turntable and the centering unit and a lower end thereof has a gradient of about 39° to 42° with respect to an axial direction of the rotating shaft. In the case of elastically supporting the centering unit using the spring having the gradient of about 39° to 42° with respect to the axial direction of the rotating shaft, the centering unit may be undesirably tilted to any one side when the disc is coupled to the centering unit.

BRIEF SUMMARY

Accordingly, the present invention provides a spindle motor, which changes a structure of a spring that is an elastic member interposed between a turntable and a centering unit, thus preventing the centering unit from being tilted to any one side when a disc is coupled to the centering unit.

In one general aspect of the present invention, there is provided a spindle motor, the spindle motor comprising: a turntable coupled to a rotating shaft and supporting the rotating shaft and a disc; a centering unit fitted over the rotating shaft and supporting an inner circumference of the disc; and a coil spring interposed between the turntable and the centering unit to elastically support the centering unit, wherein a first end of the coil spring is brought into contact with a spring hanging portion protruding from a side surface of the centering unit, and a second end opposite to the first end of the coil spring is supported by a spring support portion formed in the turntable.

In another general aspect of the present invention, there is provided a spindle motor, the spindle motor comprising: a rotating shaft; a turntable coupled to a rotating shaft to be rotated along therewith, and supporting a disc; a centering unit fitted over the rotating shaft, and elastically coupled to an inner circumference of the disc; and a coil spring interposed between the turntable and the centering unit, wherein an angle between an imaginary line extending along an outer surface of the coil spring and a vertical line parallel to an axial direction of the rotating shaft ranges from 2° to 12°.

DETAILED DESCRIPTION

Figure 1:
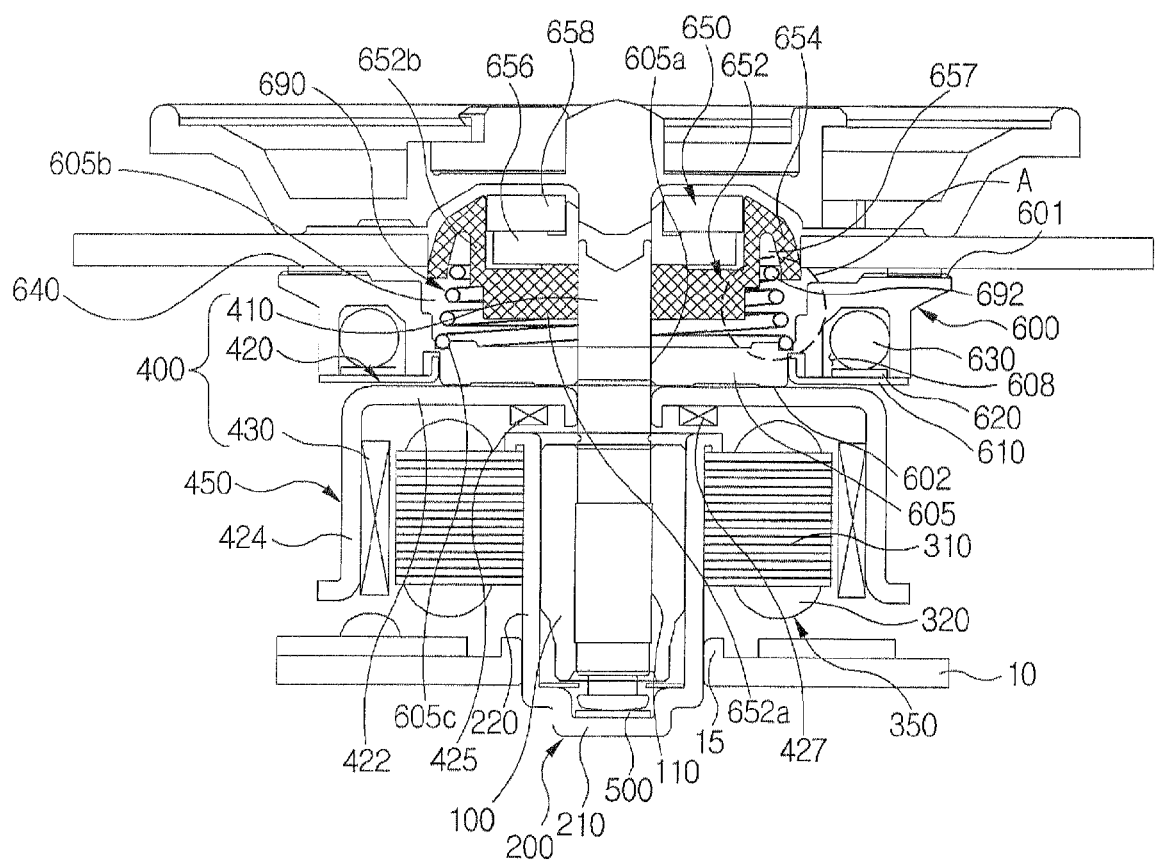
FIG. 1 is a sectional view showing a spindle motor in accordance with a first embodiment of the present invention.
Figure 2:
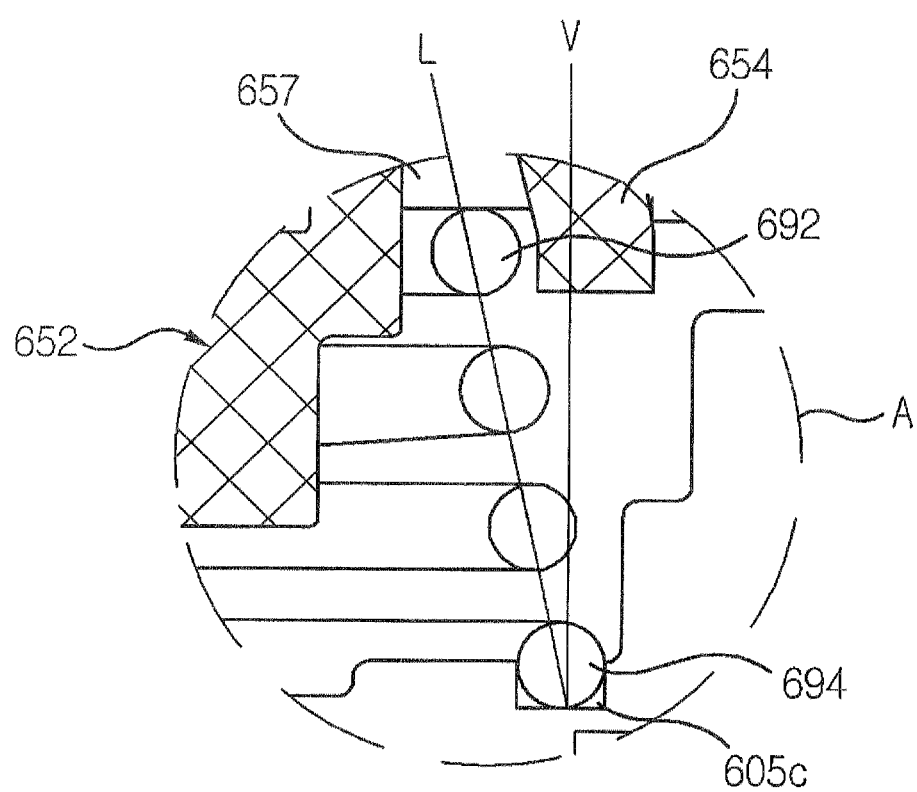
FIG. 2 is an enlarged view showing portion 'A' encircled in FIG. 1.

FIG. 1 is a sectional view showing a spindle motor in accordance with a first embodiment of the present invention. FIG. 2 is an enlarged view showing portion 'A' encircled in FIG. 1.

Referring to FIGS. 1 and 2, a spindle motor 700 includes a spindle motor unit 450, a turntable 600, a centering unit 650 and a coil spring 690.

The spindle motor unit 450 includes a base plate 10, a stator 350 and a rotor 400.

The base plate 10 is coupled to the stator 350 that will be described below, and a burring portion 15 having a burring hole is formed in a central portion of the base plate 10. The burring portion 15 may be formed by a burring process.

The stator 350 includes a bearing 100, a bearing housing 200, a core 310 and a coil 320.

The bearing 100 takes the shape of a cylinder in which a shaft insertion hole 110 is formed. The bearing 100 may comprise an oil impregnated sintered bearing for rotating a rotating shaft 410 of the rotor 400, which will be described below in detail, at a high speed.

The bearing housing 200 is shaped like a container which is open at a top thereof The bearing housing 200 includes a bottom plate 210 and a sidewall 220.

The bottom plate 210 of the bearing housing 200 takes the shape of a disc, for example, with a thrust hearing 500 being disposed on an upper surface of the bottom plate 210. The thrust bearing 500 functions to prevent the rotating shaft 410 of the rotor 400 that will be described below in detail from being worn out.

The sidewall 220 of the bearing housing 200 receives the bearing 100, and extends from an edge of the bottom plate 210 along an outer surface of the bearing 100.

In an embodiment of the present invention, the sidewall 220 is, for example, shaped like a cylinder, and the hearing 100 is inserted into the sidewall 220. The bearing 100 may be press-fitted into the bearing housing 200 so as not to rotate in the bearing housing 200.

The core 310 is formed by stacking up a plurality of steel sheets each having an opening. The core 310 has in a central portion thereof an opening, so that the core 310 is press-fitted over an outer circumference of the hearing housing 200 using the opening.

The coil 320 is wound around the core 310 using a winding portion (not shown) formed in the core 310. As current is applied to the coil 320 wound around the core 310, a magnetic field is generated from the coil 320.

The rotor 400 includes the rotating shaft 410, a yoke 420 and a magnet 430.

The rotating shaft 410 is rotatably inserted into the shaft insertion hole 110 of the bearing 100. A lower end of the rotating shaft 410 is machined to have a curved surface, for example. The rotating shaft 410 is in point contact with the thrust bearing 500 that is placed on the bottom plate 210 of the bearing housing 200.

The yoke 420 includes a top plate 422 having a disc shape, and a skirt portion 424 bent from the top plate 422 to face an end of the core 310. A burring portion 425 is formed in a central portion of the top plate 422, and is inserted through an upper end of the rotating shaft 410 in such a way as to be press-fitted over the rotating shaft 410.

A suction magnet 427 is placed on a flange portion of the bearing housing 200 that faces an inner surface of the top plate 422. The suction magnet 427 applies an attractive force to the top plate 422, thus preventing the top plate 422 from levitating because of the attractive force.

The magnet 430 is placed along an inner surface of the skirt portion 424, so that the rotor 400 is rotated relative to the stator 350 by attractive force or repulsive force between a magnetic field generated from the magnet 430 and a magnetic field generated from the coil 320 wound around the core 310.

The turntable 600 is placed on the top plate 422 of the yoke 420, and is coupled to the rotating shaft 410. In the embodiment of the present invention, the turntable 600 is press-fitted over an outer circumference of the rotating shaft 410, so that the turntable 600 is rotated along with the rotating shaft 410. The turntable 600 functions to support an optical disc for recording data.

The turntable 600 includes a turntable body 605, an annular race 608, a cover member 610 and a ball 630.

The turntable body 605 has a disc shape. The turntable body 605 includes an upper surface 601 on which the optical disc is placed, and a lower surface 602 which is opposite to the upper surface 601. A through hole 605a is formed in a central portion of the turntable body 605 in such a way as to pass through the upper surface 601 and the lower surface 602. The outer circumference of the rotating shaft 410 is press-fitted into the through hole 605a of the turntable body 605.

A concave recess portion 605b is formed in a central portion of the upper surface 601 of the turntable body 605. The recess portion 605b provides a space for receiving a portion of the centering unit 650 that will he described below in detail and the coil spring 690. A spring support portion 605c is formed in a bottom surface of the recess portion 605b so that an end of the coil spring 690, which will be described below in detail, is inserted into the spring support portion 605c. The spring support portion 605c may have a circular shape when viewed on a plane.

The annular race 608 is formed in the lower surface 602 of the turntable body 605. The annular race 608 is concentric with the through hole 605a of the turntable body 605.

Balls 630 are received in the annular race 608 that are formed in the lower surface of the turntable 600. According to the embodiment of the present invention, three to ten balls 630 are provided in the annular race 608.

The balls 630 are rotated along the annular race 608 by the rotation of the turntable 600. The balls 630 are disposed to be opposite to an eccentric portion of the rotating turntable body 605 causing eccentricity, thus compensating for the eccentricity caused by the turntable 600 and the disc mounted on the turntable 600.

The cover member 610 covers the annular race 608, and prevents the balls 630 received in the annular race 608 from being removed from the turntable body 605 that rotates at a high speed. When viewed on a plane, the cover member 610 may have a shape of a doughnut that coverts the annular race 608.

An annular felt 620 is disposed on an inner surface of the cover member 610, and is in contact with the balls 630.

An anti-slip felt 640 is placed on the upper surface 601 of the turntable 600. The anti-slip felt 640 makes contact with the optical disc to prevent a rotational slip of the optical disc.

The centering unit 650 is coupled to the rotating shaft 410 coupled with the turntable 600. Here, the centering unit 650 is coupled to a through hole formed in a center of the disc, thus aligning a rotating center of the disc with a center of the rotating shaft 410.

The centering unit (or center cone) 650 includes a body 652 and a centering portion 654. In addition to the above components, the centering unit 650 may further include a back yoke 656 and a magnet 658 for the centering unit.

The body 652 may be shaped like a container which is open at a top thereof. The body 652 includes a bottom plate 652a and a sidewall 652b.

The bottom plate 652a has a disc shape, with a through hole being formed in a central portion of the bottom plate 652a. A diameter of the through hole is greater than that of the rotating shaft 410.

The sidewall 652b extends upwards from an edge of the bottom plate 652a, and the sidewall 652b and the bottom plate 652a define a receiving space in the body 652.

The disc-shaped back yoke 656 is disposed in the receiving space in such a way as to be fitted over the rotating shaft 410, and the magnet 658 for the centering unit is received in the receiving space in such a way as to be disposed on the back yoke 656. The magnet 658 for the centering unit is fitted over the rotating shaft 410 and placed on the back yoke 656.

The centering portion 654 of the centering unit 650 is placed on an outer surface of the sidewall 652b of the body 652. The centering portion 654 is provided on the outer surface of the sidewall 652b of the body 652, and is inclined from an upper end of the outer surface of the sidewall 652b to a lower end thereof. The centering portion 654 elastically presses an inner surface formed by the through hole of the optical disc, thus aligning the rotating center of the optical disc with the rotating center of the rotating shaft 410.

Meanwhile, a spring hanging portion 657 is provided between the centering portion 654 and the sidewall 652b of the body 652 of the centering unit 650.

The spring hanging portion 657 protrudes from an outer surface of the sidewall 652b, and makes contact with an end of the coil spring 690 that will be described below in detail.

The spring hanging portion 657 may protrude from the outer surface of the sidewall 652b in a shape of an annular ring. Alternatively, a plurality of spring hanging portions 657 may protrude intermittently from the outer surface of the sidewall 652b.

The coil spring 690 is fitted over the rotating shaft 410. The coil spring 690 fitted over the rotating shaft 410 is interposed between the recess portion 605b formed in the upper surface of the turntable 600 and the centering unit 650.

In the embodiment of the present invention, the coil spring 690 may have a shape of a truncated cone. To be more specific, the coil spring 690 includes a first end 692 that is in contact with the spring hanging portion 657 of the centering unit 650, and a second end 694 that is opposite to the first end 692 and is inserted into the spring support portion 605c.

The first end 692 of the coil spring 690 has a first diameter, and the second end 694 that is opposite to the first end 692 has a second diameter that is greater than the first diameter, so that the entire shape of the coil spring 690 is a truncated cone, for example.

In the embodiment of the present invention, an angle between an imaginary line L connecting the first and second ends 692 and 694 of the truncated conical coil spring 690 and a vertical line V parallel to an axial direction of the rotating shaft 410 is very important.

In the embodiment of the present invention, if the angle between the imaginary line L and the vertical line V is a predetermined angle or more, the centering unit 650 may be tilted relative to the upper surface of the turntable 600 when the optical disc is coupled to the centering unit 650, so that the optical disc may not be precisely coupled to the centering portion 654 of the centering unit 650.

According to the embodiment of the present invention, in order to prevent the centering unit 650 from being tilted relative to the upper surface of the turntable 600 when the optical disc is coupled to the centering unit 650, the angle between the imaginary line L and the vertical line V may range from 2° to about 12°. Preferably, the angle between the imaginary line L and the vertical line V may be about 7° (±5°).

As described above, the present invention provides a spindle motor, in which a coil spring that is an elastic member interposed between a centering unit and a turntable so as to elastically support a centering unit has a shape of a truncated cone, and an angle between an outer surface of the coil spring and an axial direction of the rotating shaft is adjusted, thus preventing defectiveness caused by the tilting of the centering unit when the centering unit is coupled to an optical disc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spindle motor, comprising:
   a base plate;
   a bearing housing coupled to the base plate;
   a rotating shaft connected to the bearing housing;
   a rotor coupled to the rotating shaft;
   a stator mounted on an outer surface of the bearing housing to rotate the rotor;
   a turntable coupled to the rotating shaft, and supporting the rotating shaft and a disc;
   a centering unit fitted over the rotating shaft, and supporting an inner circumference of the disc; and
   a coil spring interposed between the turntable and the centering unit to elastically support the centering unit,
   wherein a first end of the coil spring is brought into contact with a spring hanging portion protruding from a side surface of the centering unit, and a second end opposite to the first end of the coil spring is supported by a spring support portion formed in the turntable,
   wherein the bearing housing includes a bearing to rotate the rotor,
   wherein the stator includes a core coupled to an outer circumference of the bearing housing, and a coil wound around the core, and
   wherein the rotor includes a yolk having a burring part coupled to the rotating shaft, and a magnet attached to an inner surface of the yoke and facing the core.

2. The spindle motor as set forth in claim 1, wherein the first end of the coil spring has a first diameter, and the second end has a second diameter that is greater than the first diameter.

3. The spindle motor as set forth in claim 2, wherein an angle between an imaginary line extending along an outer surface of the coil spring and a vertical line parallel to an axial direction of the rotating shaft ranges from 2° to 12°.

4. The spindle motor as set forth in claim 3, wherein the angle between the imaginary line and the vertical line is 7°.

5. The spindle motor as set forth in claim 1, wherein the spring hanging portion protrudes from the side surface of the centering unit in a shape of an annular protrusion.

6. The spindle motor as set forth in claim 1, wherein the spring hanging portion comprises a plurality of hanging protrusions that protrude from the side surface of the centering unit.

7. The spindle motor as set forth in claim 1, wherein the spring support portion has a shape of an annular trench when viewed on a plane.

8. The spindle motor as set forth in claim 1, wherein the centering unit includes a body having a shape of a container that is open at a top thereof and forming the side surface. and a centering portion inclined from an upper end of the body to a lower end opposite to the upper end of the body.

9. The spindle motor as set forth in claim 1, wherein the coil spring is formed by winding a wire in a shape of a truncated cone.

10. A spindle motor, comprising:
    a base plate;
    a bearing housing coupled to the base plate;
    a rotating shaft connected to the bearing housing;
    a rotor coupled to the rotating shaft;
    a stator mounted on an outer surface of the bearing housing to rotate the rotor;
    a turntable coupled to the rotating shaft to be rotated along therewith, and supporting a disc;
    a centering unit fitted over the rotating shaft, and elastically coupled to an inner circumference of the disc; and
    a coil spring interposed between the turntable and the centering unit,
    wherein an angle between an imaginary line extending along an outer surface of the coil spring and a vertical line parallel to an axial direction of the rotating shaft ranges from 2° to 12°,
    wherein the bearing housing includes a bearing to rotate the rotor,
    wherein the stator includes a core coupled to an outer circumference of the bearing housing, and a coil wound around the core, and
    wherein the rotor includes a yolk having a burring part coupled to the rotating shaft and a magnet attached to an inner surface of the yolk and facing the core.

11. The spindle motor as set forth in claim 10, wherein the coil spring includes a first end making contact with the turntable and having a first diameter, and a second end making contact with the centering unit and having a second diameter that is smaller than the first diameter.

12. The spindle motor as set forth in claim 11, wherein the coil spring has a shape of a truncated cone.

13. The spindle motor as set forth in claim 10, wherein the turntable includes a spring support portion to receive an end of the coil spring.

14. The spindle motor as set forth in claim 13, wherein the spring support portion has a shape of an annular recess.

15. The spindle motor as set forth in claim 10, wherein an end of the coil spring making contact with the centering unit is in contact with a spring hanging protrusion that protrudes from a side surface of the centering unit.

16. The spindle motor as set forth in claim 15, wherein the spring hanging protrusion protrudes along the side surface of the centering unit in a ring shape.

17. The spindle motor as set forth in claim 15, wherein the spring hanging protrusion comprises a plurality of spring hanging protrusions protruding from the side surface of the centering unit.

18. The spindle motor as set forth in claim 10, wherein the angle between the imaginary line and the vertical line is 7°.

* * * * *